US007900966B1

(12) United States Patent
Stennett

(10) Patent No.: US 7,900,966 B1
(45) Date of Patent: Mar. 8, 2011

(54) VALET PARKING ENVELOPE AND METHOD OF USE

(75) Inventor: Robert Stennett, Coral Springs, FL (US)

(73) Assignee: Global Real Estate Investment Project, LLC, Coral Springs, FL (US)

( * ) Notice: Subject to any disclaimer, the term of this patent is extended or adjusted under 35 U.S.C. 154(b) by 17 days.

(21) Appl. No.: 12/486,037

(22) Filed: Jun. 17, 2009

Related U.S. Application Data

(60) Provisional application No. 61/073,178, filed on Jun. 17, 2008.

(51) Int. Cl.
*B42D 15/00* (2006.01)
*G09F 15/00* (2006.01)
*A45C 11/32* (2006.01)
*B65D 27/00* (2006.01)
*B60Q 1/48* (2006.01)

(52) U.S. Cl. .............. 283/23; 40/634; 40/674; 206/37.1; 206/425; 229/68.1; 229/70; 229/74; 283/70; 283/81; 340/932.2

(58) Field of Classification Search ........ 206/37.1–37.8, 206/38–38.1, 425; 40/299.01, 634, 673–675; 283/23–28, 70, 81, 101; 340/5.64–5.67, 340/932.2; 229/68.1, 70, 74
See application file for complete search history.

(56) References Cited

U.S. PATENT DOCUMENTS

| | | | | |
|---|---|---|---|---|
| 1,405,136 | A * | 1/1922 | Ingraham | 206/38.1 |
| 4,592,157 | A * | 6/1986 | Kerr | 283/70 |
| 5,671,849 | A * | 9/1997 | Bacon | 211/85.2 |
| 5,690,212 | A * | 11/1997 | Huang Hsu | 206/37.8 |
| 5,959,540 | A * | 9/1999 | Walter | 340/5.64 |
| 6,352,608 | B1 * | 3/2002 | Garden | 283/81 |
| 6,898,880 | B2 * | 5/2005 | Best et al. | 40/299.01 |
| 7,246,459 | B2 * | 7/2007 | Lewis | 40/673 |
| 7,293,384 | B2 * | 11/2007 | Lewis | 40/673 |
| 2002/0163443 | A1 * | 11/2002 | Stewart et al. | 340/932.2 |

* cited by examiner

*Primary Examiner* — Bryon P Gehman
(74) *Attorney, Agent, or Firm* — Gold & Rizvi, P.A.; H. John Rizvi; Glenn E. Gold

(57) ABSTRACT

A valet parking envelope includes a front panel and a rear panel. The front panel of the valet parking envelope preferably includes an identification number, vehicle owner area, a date/time area, a vehicle make/model area, a color area, a license plate area, emergency contact area and a valet driver area. A vehicle tag and an owner coupon are removably attached to a bottom of the valet parking envelope. The rear panel of the valet parking envelope includes a right side image of a vehicle, a top image of a vehicle and a left side image a vehicle. The valet parking envelope further includes a flap and a metal clasp. A vehicle key is preferably retained relative to the valet parking envelope with a length of string. A storage box with a lid may be used to retain a plurality of valet parking envelopes.

6 Claims, 7 Drawing Sheets

VALET PARKING ENVELOPE AND METHOD OF USE

CROSS-REFERENCE TO RELATED APPLICATION

This Non-Provisional Utility application claims benefit of co-pending U.S. Provisional Patent Application Ser. No. 61/073,178, filed on Jun. 17, 2008, which is incorporated herein in its entirety.

BACKGROUND OF THE INVENTION

1. Field of the Invention

The present invention relates generally to valet parking and more particularly, to valet parking envelopes, which prevent the misplacement of keys for vehicles.

2. Description of the Prior Art

Valet parking requires that the keys of a vehicle be associated with a vehicle and a location in which the vehicle is parked. Valet parking is done in a variety of ways, but it is not uncommon for a vehicle owner to hand over their keys to a valet driver at the entrance of a complex. The valet driver parks the vehicle and some how associates the keys with a vehicle. When the vehicle owner wants their vehicle back, someone from the valet company gives the keys back to the owner of the vehicle. However, it appears that the prior art lacks any foolproof method of ensuring that the keys get associated with the proper vehicle and the vehicle is associated with the rightful owner.

One such association is the use of a segmented tag. The tag includes three subsections: (1) a tag which gets affixed to the vehicle's rear view mirror, (2) a portion which is fastened to the keys, and (3) a receipt which is handed to the vehicle's owner. The tag lacks any identification of the vehicle's owner. The tag lacks any identification for damage on the vehicle. There is a risk of the key becoming disassociated from the identification tag. The keys are then placed upon a wall comprising a plurality of hooks, whereby the attendant is required to search through the multiple sets of keys to find the set of keys associated with the provided receipt.

Accordingly, there is an established need for a valet parking envelope, which ensures that vehicle keys are associated with the vehicle and the vehicle is associated with the owner.

SUMMARY OF THE INVENTION

The invention is directed to a valet parking envelope, which provides an envelope that ensures vehicle keys are associated with the vehicle and the vehicle is associated with the owner.

In one general aspect of the present invention, the valet parking envelope includes areas for printing the vehicle owner, the make of the vehicle, the model of the vehicle, the color of the vehicle, the license plate number, owner contact information and the identity of the valet driver on one side of the envelope.

In another aspect of the present invention, the valet parking envelope includes a top, left side and right side views of the vehicle for identifying areas of previous damage on the other side of the envelope.

In a further aspect of the present invention, the valet parking envelope includes an identification number.

In yet a further object of the present invention, the valet parking envelope includes two stubs that are removably attached to a bottom of the envelope.

In yet a further object of the present invention, the valet parking envelope includes a string for attachment of a vehicle key.

In yet a further aspect of the present invention, a plurality of used and unused valet parking envelopes are preferably stored in a storage box having a plurality of partitions.

These and other aspects, features, and advantages of the present invention will become more readily apparent from the attached drawing and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Figure 2:
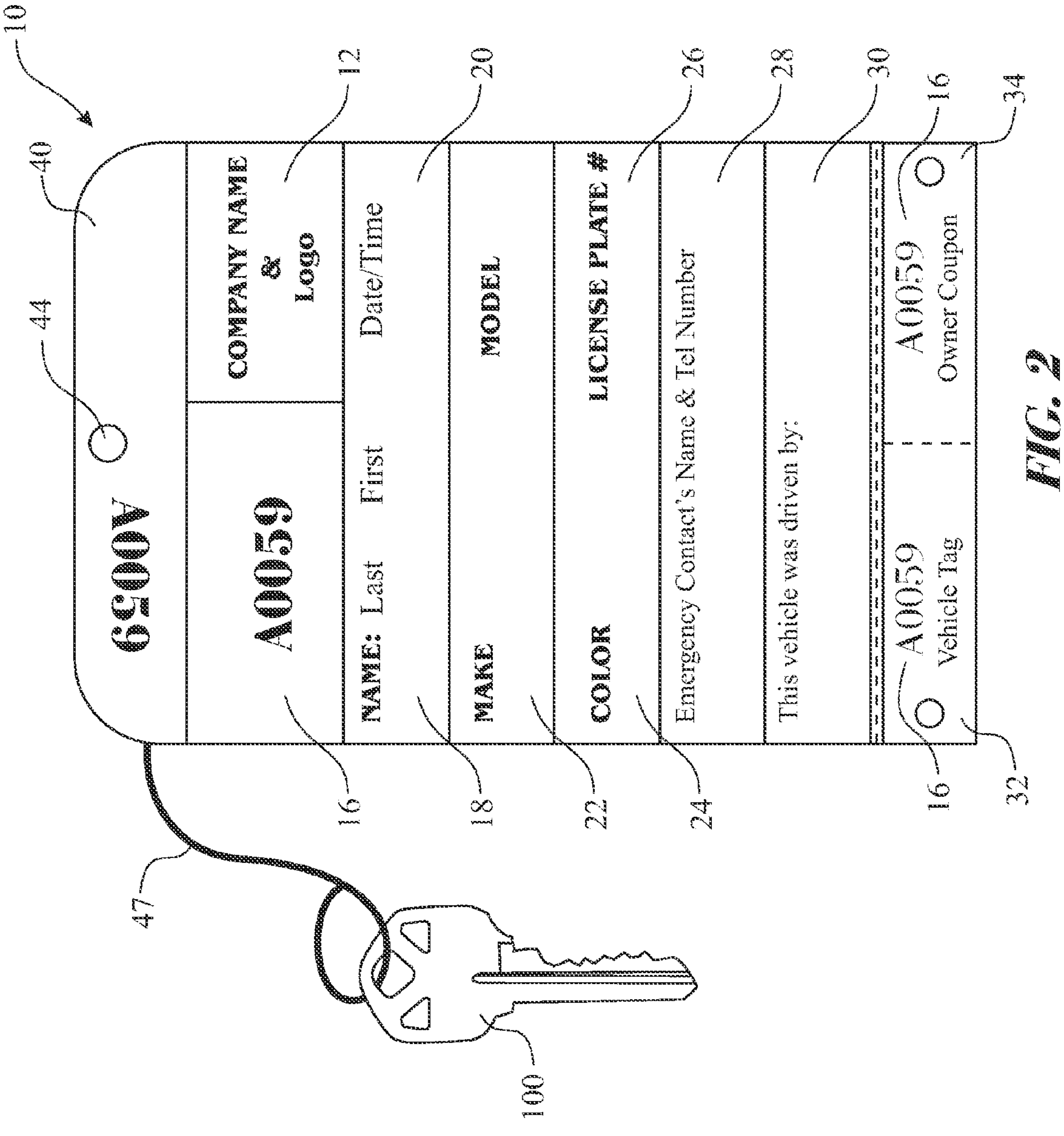
FIG. 2 is a front view of a valet parking envelope retaining a vehicle key with a string.
Figure 3:
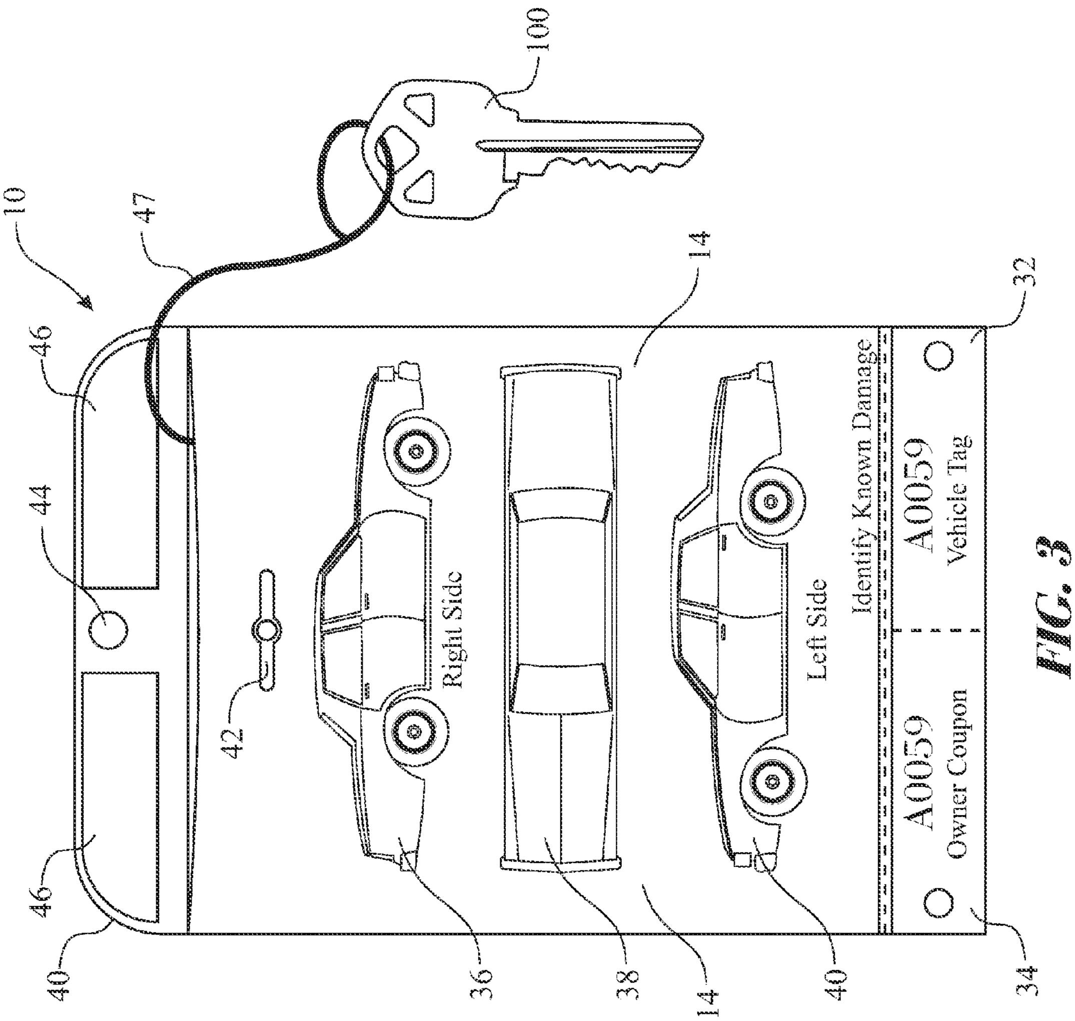
FIG. 3 is a rear view of a valet parking envelope retaining a vehicle key with a string.
Figure 4:
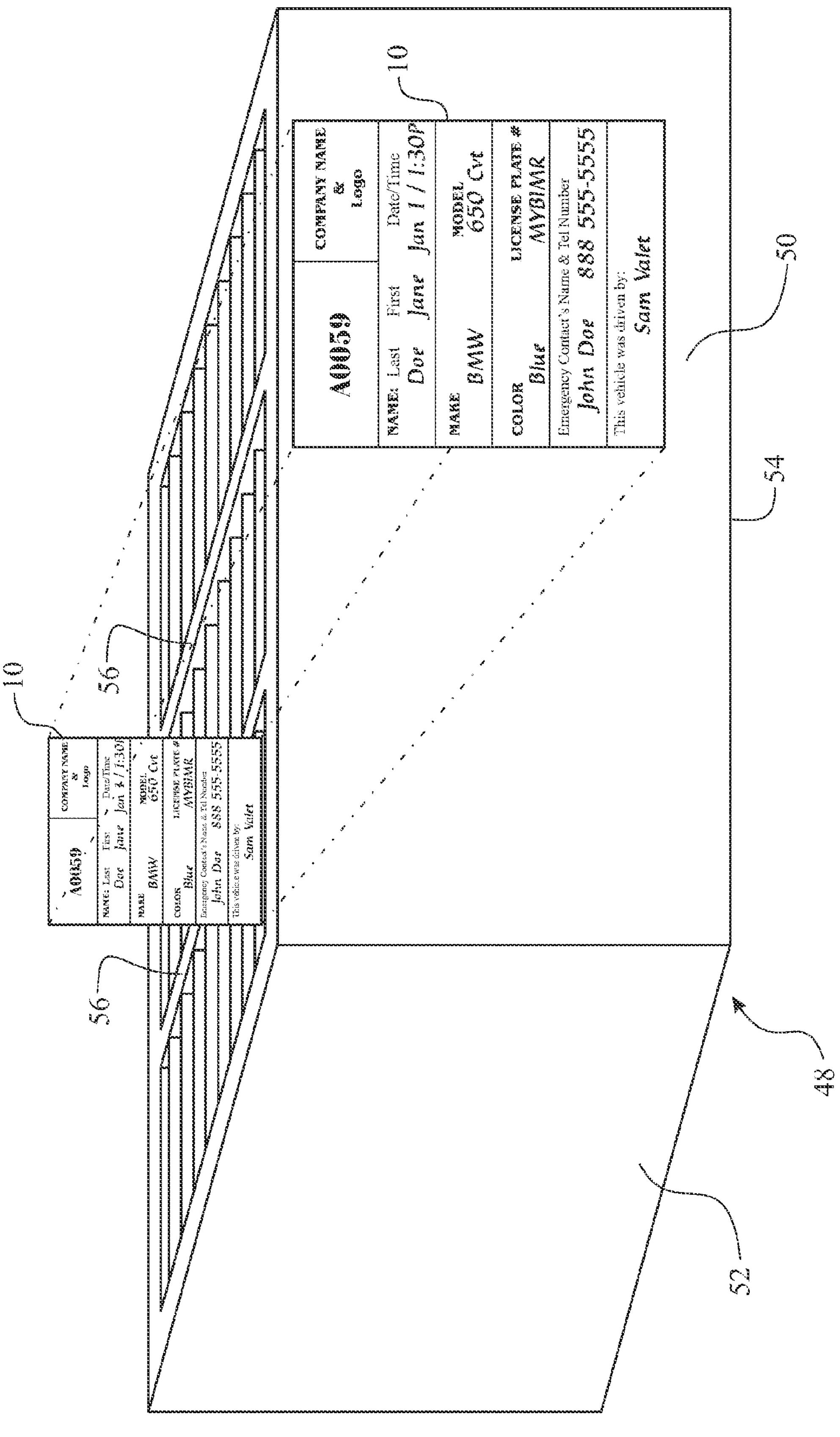
FIG. 4 is a perspective view of a storage box, which retains a valet parking envelope in an upright position.

Shown throughout figures, the present invention is generally directed to a valet parking envelope 10. With reference to FIGS. 2-3, the valet parking envelope 10 includes a front panel 12 and a rear panel 14 sealed together along each of a left and a right edge, as well as along a lower region. The front panel 12 of the valet parking envelope 10 preferably includes an identification number 16, vehicle owner area 18, a date/time area 20, a vehicle make/model area 22, a color area 24, a license plate area 26, emergency contact area 28 and a valet drive area 30. It is understood the markings can alternately be included on the rear panel 14. A vehicle tag 32 and an owner coupon 34 are removably attached to a bottom of the valet parking envelope 10. The valet attendant can include a reference identification of the parking location of the vehicle on the valet parking envelope 10. It is understood the vehicle tag 32 and owner coupon 34 can be removably attached to a side edge or the edge of a flap 40 of the valet parking envelope 10.

The owner's name is written in the vehicle owner area 18. The date and time that the vehicle is received by the valet attendant is written in the date/time area 20. The make and model of the vehicle is written in the vehicle make/model area 22. The color of the vehicle is written in the color area 24. The license plate number is written in the license plate area 26. The name and phone number of an emergency contact person is written in the emergency contact area 28. The valet driver writes their name into the valet driver area 30. The vehicle tag 32 includes the identification number 16. The vehicle tag 32 can be placed upon or left within the vehicle or given to the owner of the vehicle. The owner coupon 34 also includes the identification number 16 and preferably includes a discount on the purchase of goods or services from at least one business.

The rear panel 14 of the valet parking envelope 10 includes a right side image of a vehicle 36, a top image of a vehicle 38 and a left side image a vehicle 40. Any vehicle damage is marked on any of the vehicle images 36, 38, and 40. It is understood the markings can alternately be included on the front panel 12. The valet parking envelope 10 further includes a flap 40 and a metal clasp 42. A clasp hole 44 is formed through the flap 40 to receive the metal clasp 42. Two adhesive strips 46 are preferably formed on the flap 40 for sealing to the rear panel 14. One end of a length of string 47 is attached to the valet parking envelope 10 with any suitable method. The other end of the string 47 is tied to the vehicle key 100. The vehicle key 100 is stored in the valet parking envelope 10.

Figure 1:
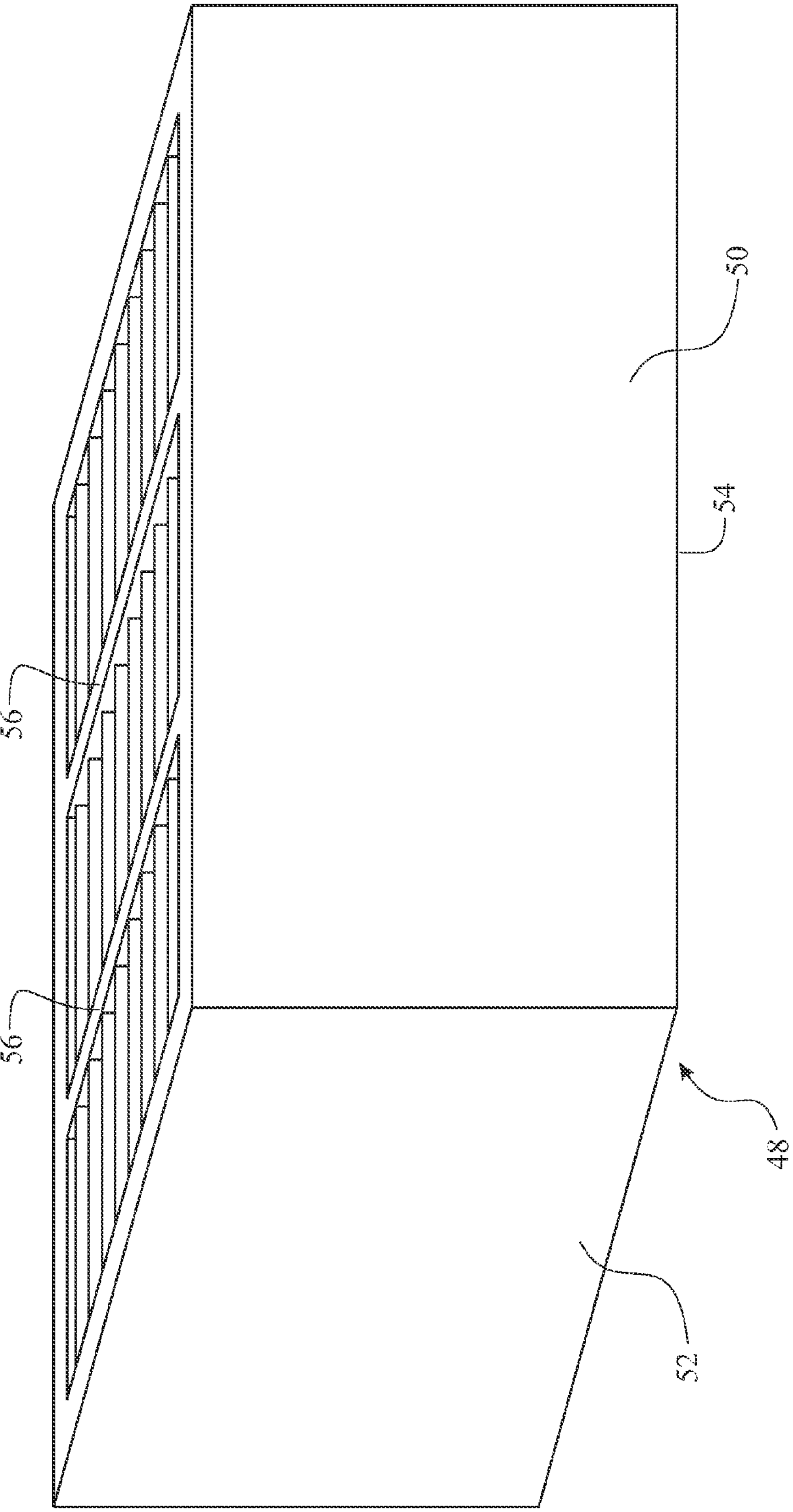
FIG. 1 is a perspective view of a storage box for retaining a plurality of used and unused valet parking envelopes.
Figure 5:
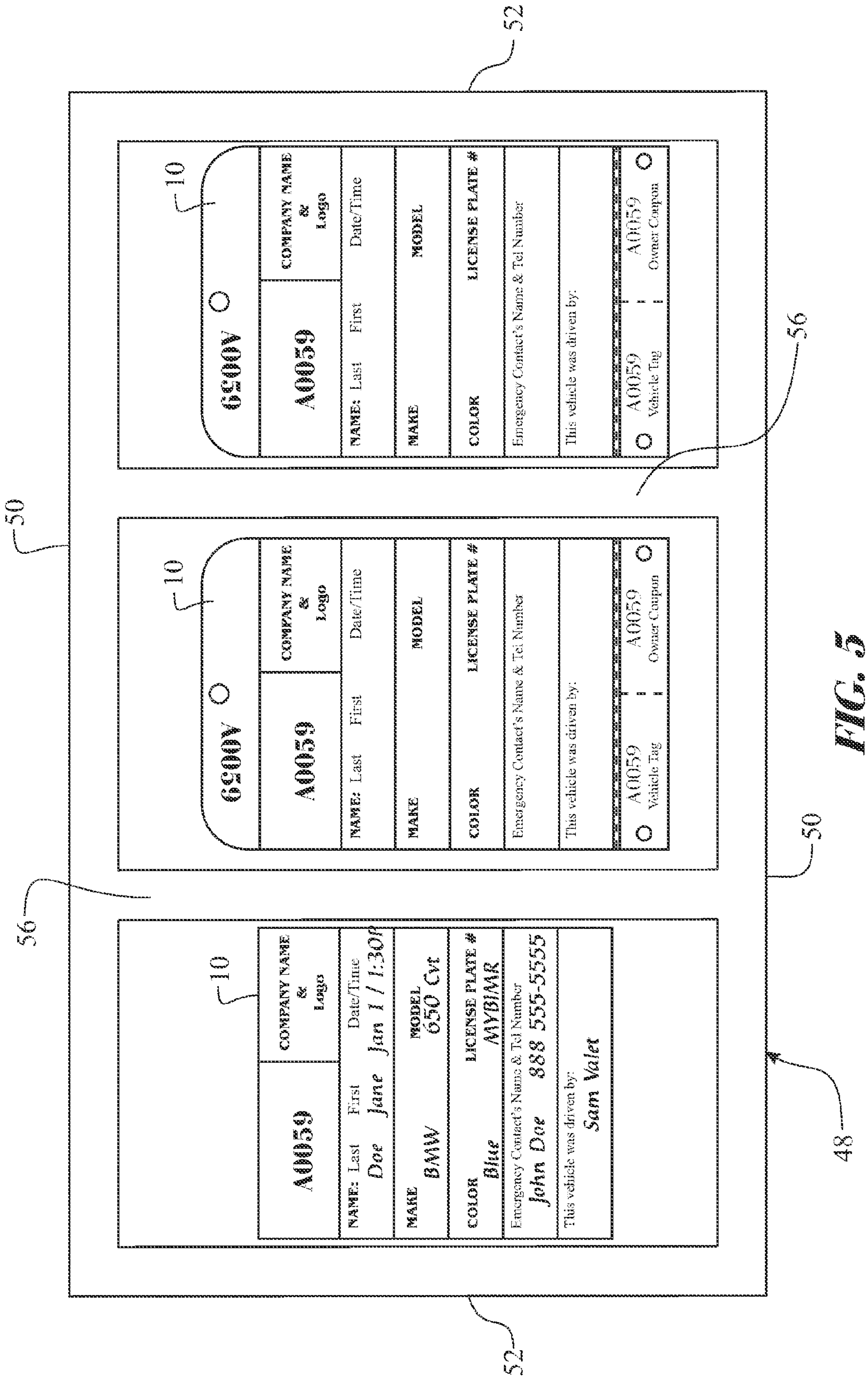
FIG. 5 is a top view of a storage box with a stack of valet parking envelopes containing keys and two stacks of valet parking envelopes without keys.
Figure 6:
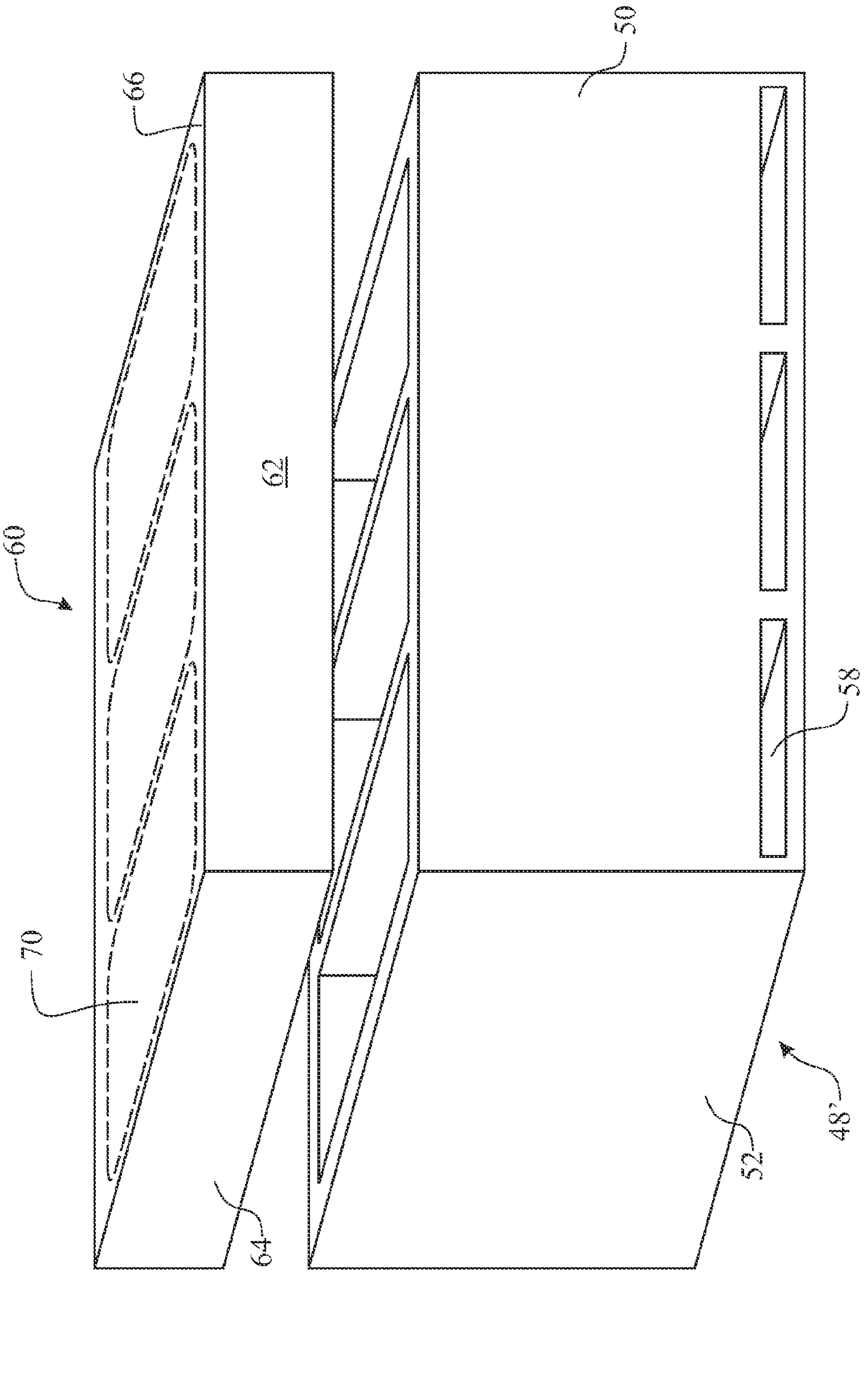
FIG. 6 is a perspective view of a storage box with a perforated lid positioned above thereof for retaining a plurality of valet parking envelopes.
Figure 7:
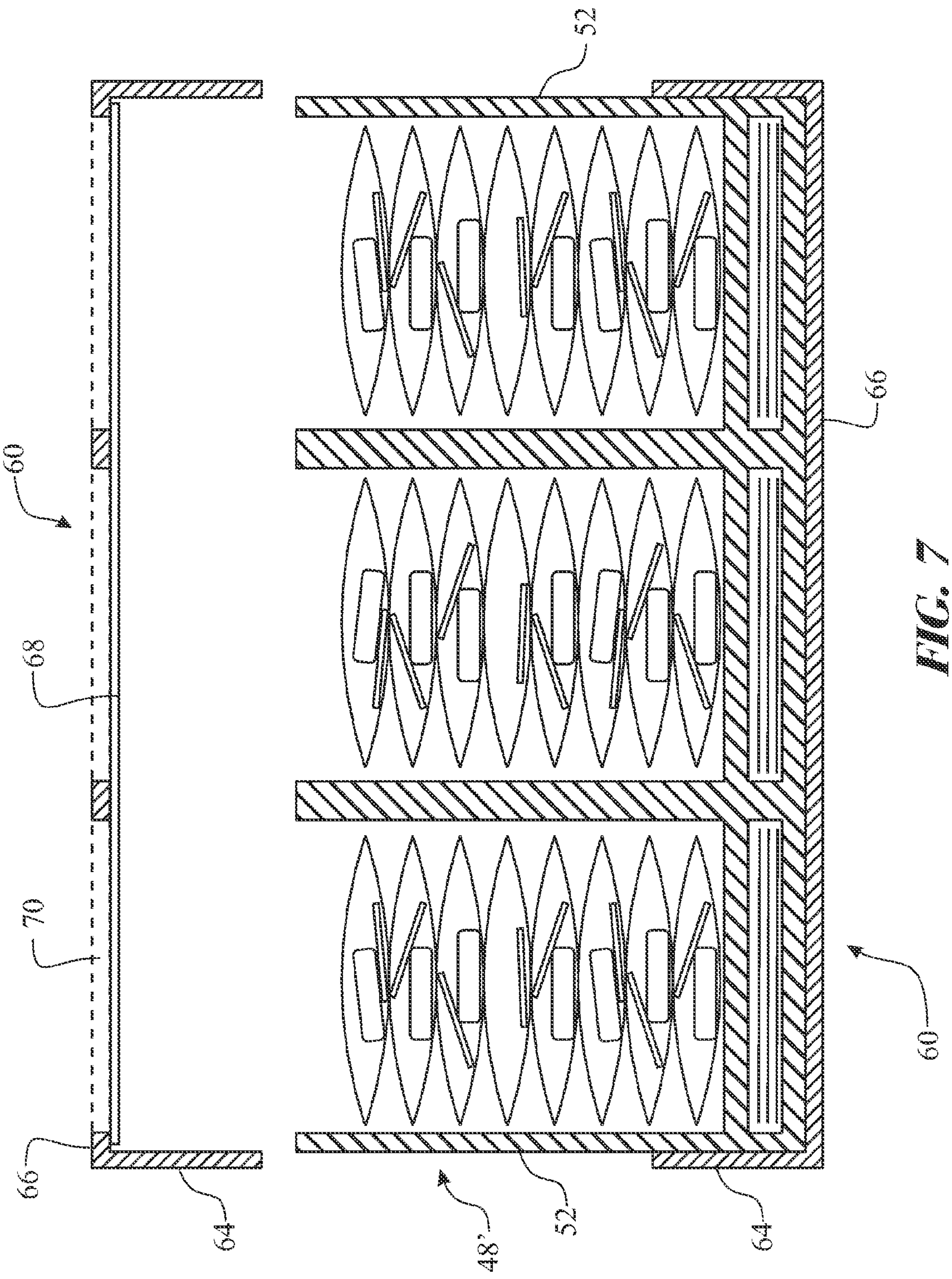
FIG. 7 is a cross sectional view of a storage box with a perforated lid position above and on a bottom thereof for retaining a plurality of valet parking envelopes with and without keys.

With reference to FIGS. 1 and 5, a storage box 48 includes two side walls 50, two end walls 52, a bottom support 54 and at least two partitions 56. A plurality of valet parking envelopes 10 are stored between the at least two partitions 56. With reference to FIGS. 6-7, a storage box 48' includes at least one envelope storage slot 58 located below the bottom support 54. A perforated lid 60 includes two side walls 62, two end walls 64, a top cover 66, and a clear insert 68. Three openings 70 are preferably formed through the top cover 66. The clear insert 68 is attached to a bottom of the top cover 66. The three openings 70 and the clear insert 68 allow the valet parking envelopes 10 to be viewed, when the perforated lid 60 is on top of the storage box 48, 48'. An inside perimeter of the perforated lid 60 is sized to receive a top or bottom of the storage box 48, 48'.

The vehicle key 100 is secured to the valet parking envelope 10 via a string 47 and then placed within the interior of the valet parking envelope 10. The vehicle tag 32 and owner coupon 34 are separated from the valet parking envelope 10, with the vehicle tag 32 placed inside the vehicle, and the owner coupon 34 given to the vehicle's owner. The valet parking envelope 10 is then inserted into the storage box 48, 48'. It is preferable that the valet parking envelope 10 is inserted in an organized manner such as an indexed order or separated by identifiers, which aid in locating a specific valet parking envelope 10.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method for valet parking vehicle identification, comprising:

placing a vehicle's key into a key receptacle portion of an envelope, the envelope further having attached thereto a detachable vehicle tag portion and a detachable coupon tag portion, and a respective common identification number disposed on each of said envelope and said tag portions:

subsequently separating the vehicle tag portion, the coupon tag portion, and the envelope;

placing separated the vehicle tag portion visibly within the vehicle;

transferring the separated coupon tag portion to the vehicle's user; and placing the separated key holding envelope into a storage box.

2. The method for valet parking vehicle identification of claim 1, the method further comprising the step of:

placing the key holding envelope into the storage box respective to an indexing order based upon the identification number.

3. The method for valet parking vehicle identification of claim 2, the method further comprising the step of:

retrieving the key holding envelope from within the storage box utilizing the indexing order.

4. The method for valet parking vehicle identification of claim 1, the method further comprising the step of:

including a right side image of a vehicle, a top image of a vehicle, and a left side image a vehicle on one of a front panel and a rear panel of the key holding envelope; and identifying and indicating any vehicle damage appropriately on the right side image of a vehicle, the top image of a vehicle, and the left side image of a vehicle.

5. The method for valet parking vehicle identification of claim 1, the method further comprising the step of:

tying the vehicle's key to the key holding envelope via a string, then inserting the vehicle's key into the key holding envelope.

6. The method for valet parking vehicle identification of claim 1, the method further comprising the step of:

identifying a vehicle owner's contact information on the key holding envelope.

* * * * *